Patented Apr. 28, 1925.

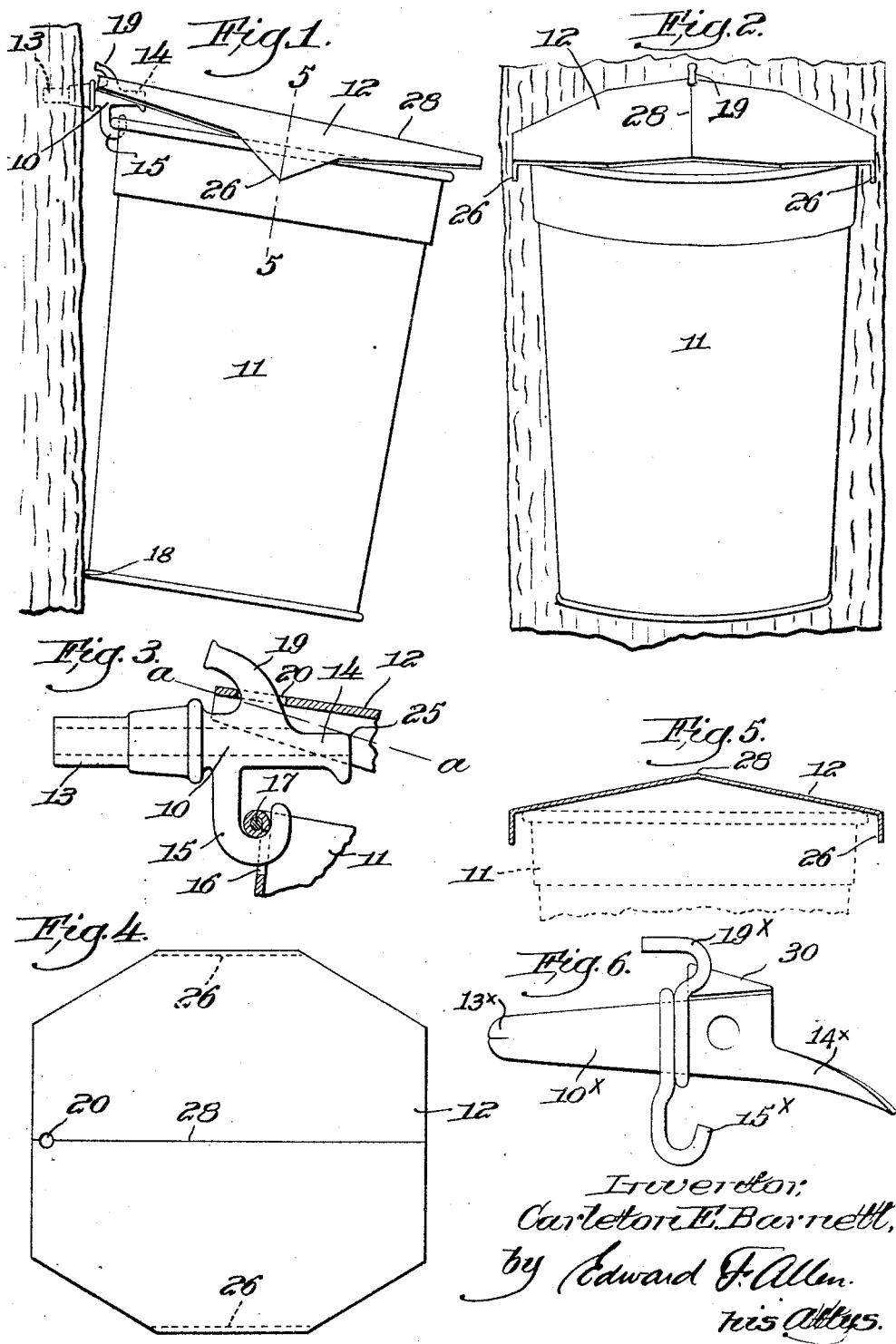

1,535,087

UNITED STATES PATENT OFFICE.

CARLETON E. BARNETT, OF CAMBRIDGE, MASSACHUSETTS.

APPARATUS FOR COLLECTING SAP FROM TREES.

Application filed April 7, 1922. Serial No. 550,499.

*To all whom it may concern:*

Be it known that I, CARLETON E. BARNETT, a citizen of the United States of America, and a resident of Cambridge, in the county of Middlesex and Commonwealth of Massachusetts, and whose post-office address is 820 Massachusetts Avenue, have invented certain new and useful Improvements in Apparatus for Collecting Sap from Trees, of which the following is a specification.

This invention relates to apparatus for collecting sap from trees and is particularly adapted for use in connection with the maple sugar industry.

An object of the invention is the production of a sap spout of simple and durable structure that is adapted to support a sap bucket and also provided with means to detachably support a cover for said bucket.

A further object of the invention is to so arrange the cover and supporting means therefor that they may be interlocked one with the other and when so locked the cover will be held from accidental dislodgement but may be instantly removed if it is desired to do so.

A further object being the production of a cover adapted to interlock with means carried by the spout, that is so arranged as to offer a passage for air between it and the bucket which it covers while at the same time full and ample protection is afforded the contents of the bucket from rain, snow and falling leaves, twigs or other foreign matter which might otherwise enter the said bucket and impair the contents thereof.

Heretofore bucket covers have been used which were frictionally held on the bucket and had to be at times forcibly removed in order to obtain access to the interior thereof and when replaced were oftentimes improperly placed and left in such position as to be readily knocked or blown off the bucket, thereby exposing the contents thereof to the elements.

Other covers have had pivotal engagement with the spout which necessitated the use and care of a third element or member in the form of a pintle or pivot rod which was objectionable also because the use of two hands was required in adjusting the cover to or removing it from the bucket.

The present invention among its other features includes a sap spout provided with means to removably attach a cover thereto in such manner that the said cover may be held in its covering position independently of the bucket or it may be arranged to be partially held by the bucket while interlocked with the means on the spout.

Furthermore access to the bucket may be had by merely raising it with one hand and it may be attached to or detached from the locking means of the spout by one hand and is of such construction or arrangement as to effectively protect the contents of the bucket from falling matter and yet allow a current of air to circulate beneath it which in the collection of maple sap is a matter of considerable importance.

Other objects of the invention will be fully understood from a description of the drawings and the claims hereinafter given.

Of the drawings:

Figure 1 represents a side view of the sap collecting apparatus embodying this invention as it would appear when in use.

Figure 2 a view looking toward the left Figure 1.

Figure 3 an enlarged side view of the sap spout as seen in Figure 1, a portion each of the bucket and cover being shown therewith.

Figure 4 a top plan view of the cover removed from the spout.

Figure 5 a section on the line 5—5 Figure 1.

Figure 6 shows a form of spout commonly used having the present invention applied thereto.

Like characters represent like parts throughout the several figures of the drawing.

Referring to the drawings:

The apparatus constituting the present invention consists of a sap spout 10 a bucket 11 and a cover 12 therefor and while the bucket may be of any usual or suitable form, size or material, certain improvements have been made in the manner of supporting the cover and in the arrangement of the cover itself.

The form of spout shown in Figures 1 and 3 is the preferred form, but it is obvious that other forms might be used in connection with the invention, as illustrated by Figure 6 without departing from its spirit and scope.

The spout 10 has the usual tree penetrating portion 13, snout 14 and bucket supporting hook 15.

As is usual the bucket 11 has a hole 16 adjacent the reinforcing ring 17 at the top edge thereof which is adapted to engage the hook 15, the lower part of the bucket resting against the tree as at 18.

Upwardly extending from the spout 14 is, in this instance, a hook shaped member 19 adapted to enter the hole 20 of the cover 12, said hook being so located and of such shape as to preferably require the cover to be presented thereto at an angle of approximately 45 degrees, in order to cause engagement of the hook 19 and hole 20, and thereafter the cover may be made to assume the position shown in Figure 1.

It will thus be seen that even though the cover is very readily applied and detached at will, it is also very effectively locked in position against dislodgment by wind gusts or carelessness on the part of the attendant.

As herein shown the said cover is being partly supported by the bucket 11 but it is obvious that if occasion required it might be locked with and supported wholly by the said spout 10 as indicated by dotted lines $a$—$a$ Figure 3 wherein it rests on the end 25 of the snout 14.

Another feature of the invention consists of the arrangement of the cover which is considered novel inasmuch as it is so shaped as to form an effectual water shed and conveniently provides for a circulation of air beneath it.

The cover shown is hexagonal in shape, two of the corners 26 being turned at approximately right angles to the body of the cover to afford abutments which prevent lateral displacement when in use; this happens to be a convenient shape but it is obvious that other shapes may be employed to suit the fancy or the occasion so long as abutment portions are provided which are adapted to engage the bucket or even the spout to prevent the aforesaid lateral displacement. It is considered important to allow a current of air to circulate between the cover and the contents of the bucket, especially in the gathering of maple sap during sunny weather.

For this reason the present invention includes a cover which may be arched but preferably bent as shown so that the portions on each side of the median line 28 form intersecting planes and so formed that the portions adjacent the abutment 26 may contact with the bucket if desired while the portion adjacent the median line thereof assumes a position appreciably above the bucket rim or edge.

This formation furnishes an excellent water shed and at the same time permits the passage of wind gusts or air currents on both sides of the cover, thereby greatly reducing the tendency, if one exists, to blow the cover upwardly from the bucket and expose the contents thereof to the elements, and prevents the trapping of air which might become heated by the run's rays.

Figure 6 shows a form of spout commonly used and to which the present invention may be applied. This spout $10^x$ is of sheet metal having the tree entering or penetrating portions $13^x$ and dripway or snout $14^x$, and removably applied thereto, a wire bucket hook $15^x$. In this instance, however, the wire of the bucket hook is continued upwardly to form the cover engaging hook $19^x$ which may be so shaped as to find a bearing against the upwardly protruding overlapped portions of the body of the spout shown at 30, to thereby provide the spout with means adapted to be engaged by the cover.

Other forms might be used but for the purpose of this invention it is not thought necessary to illustrate further.

Having described the invention I claim:

1. In an apparatus for collecting sap from trees, a spout having means thereon to support a bucket; a bucket adapted to be supported by said means; means provided on said spout to detachably engage and support a cover, said means comprising an upstanding and rearwardly extending tapered horn integrally formed with said spout; a cover for said bucket composed of a blank bent at the median line to form a ridge having sloping flat faces extending laterally therefrom its underface being normally in contact with said bucket at two diametrically opposite points whereby an air space is provided between said cover and said bucket for the passage of air over the mouth of the bucket from all directions, said cover having a hole adapted to engage said tapered horn, and having depending ears to engage the sides of the bucket at times, but normally out of contact therewith whereby the said cover may be raised off said bucket for the purpose of inspecting the contents thereof and lateral displacement of said cover is restrained when it is in position on said bucket.

2. In an apparatus for collecting sap from trees, a spout having means thereon to support a bucket; a bucket adapted to be supported by said means; means carried by said spout to detachably engage and support a cover, said means comprising an upstanding and rearwardly bent hook mounted on said spout; a cover for said bucket composed of a blank bent at the median line to form a ridge having sloping flat surfaces extending laterally therefrom and its under side adapted to contact with said bucket at only two diametrically opposite points approximately perpendicular to said ridge whereby an air space is provided between said cover and the mouth of said bucket for the passage of air currents over the mouth of said bucket from all directions; said cover having a hole adjacent one edge thereof adapted to engage said hook, and having depending ears normally out of engagement with said bucket but arranged to engage the sides thereof whereby lateral displacement of the cover is restrained but permitting it to be raised off said bucket for the purpose of inspecting the contents thereof.

Signed by me at Boston, Mass., this 6th day of April, 1922.

CARLETON E. BARNETT.